US007514028B2

(12) United States Patent
Kung et al.

(10) Patent No.: US 7,514,028 B2
(45) Date of Patent: Apr. 7, 2009

(54) THERMAL RECEIVER

(75) Inventors: Teh-Ming Kung, Rochester, NY (US); Brian T. Pope, Penfield, NY (US); Ronald S. King, Fairport, NY (US)

(73) Assignee: Eastman Kodak Company, Rochester, NY (US)

( * ) Notice: Subject to any disclaimer, the term of this patent is extended or adjusted under 35 U.S.C. 154(b) by 396 days.

(21) Appl. No.: 11/035,329

(22) Filed: Jan. 13, 2005

(65) Prior Publication Data

US 2006/0154820 A1 Jul. 13, 2006

(51) Int. Cl.
*B41M 5/035* (2006.01)
*B41M 5/50* (2006.01)
*C04B 41/00* (2006.01)

(52) U.S. Cl. .................... 264/132; 156/235; 428/32.39; 503/227

(58) Field of Classification Search ....................... None
See application file for complete search history.

(56) References Cited

U.S. PATENT DOCUMENTS 5,492,786 A 2/1996 Sugimura et al.
5,529,972 A * 6/1996 Ramello et al. ............. 503/227
6,448,357 B1 9/2002 Hamada et al.
6,451,423 B1 9/2002 Armat et al.
6,469,130 B1 * 10/2002 Qin et al. .................... 528/310
7,135,433 B2 * 11/2006 Foster et al. ................ 503/227

FOREIGN PATENT DOCUMENTS

EP 0 997 783 A2 5/2000
EP 1 452 332 A1 9/2004
JP 61-14994 1/1986

OTHER PUBLICATIONS

Japanese Patent Abstract 2002-258475.
Derwent Plublications Ltd., London, GB; Section Ch, Week 198610; AN 1986-064517; XP002379246.
S. Al-Malaika: "The Antioxidant Role of alpha-tocopherol in Polymers. I." Journal of Polymer Science: Part A:Polymer Chemistry; vol. 32, 1994, pp. 3099-3113, XP002379294, p. 3101 figure 4.

* cited by examiner

*Primary Examiner*—Bruce H Hess
(74) *Attorney, Agent, or Firm*—Kathleen Neuner Manne

(57) ABSTRACT

A receiver element for thermal dye transfer, a print assembly including the receiver element, and a method of printing are described wherein the receiver element includes a dye-receiving layer on a support, wherein the dye-receiving layer includes a polymer, an optional release agent, and alpha-tocopherol or a derivative thereof.

9 Claims, 1 Drawing Sheet

THERMAL RECEIVER

FIELD OF THE INVENTION

A receiver element having a dye-receiving layer containing a release agent and alpha-tocopherol, and exhibiting good coating uniformity.

BACKGROUND OF THE INVENTION

Thermal transfer systems have been developed to obtain prints from pictures that have been generated electronically, for example, from a color video camera or digital camera. An electronic picture can be subjected to color separation by color filters. The respective color-separated images can be converted into electrical signals. These signals can be operated on to produce cyan, magenta, and yellow electrical signals. These signals can be transmitted to a thermal printer. To obtain a print, a black, cyan, magenta, or yellow dye-donor layer, for example, can be placed face-to-face with a dye image-receiving layer of a receiver element to form a print assembly which can be inserted between a thermal printing head and a platen roller. A thermal print head can be used to apply heat from the back of the dye-donor sheet. The thermal print head can be heated up sequentially in response to the black, cyan, magenta, or yellow signals. The process can be repeated as needed to print all colors. A color hard copy corresponding to the original picture can be obtained. Further details of this process and an apparatus for carrying it out are contained in U.S. Pat. No. 4,621,271 to Brownstein.

A problem exists with many of the dye-donor elements and dye image-receiving elements used in thermal dye transfer systems. At the high temperatures used for thermal dye transfer, many polymers used in these elements can soften and adhere to each other, resulting in sticking and tearing of the elements upon separation. Areas of the dye-donor layer (other than the transferred dye) can adhere to the dye image-receiving element, rendering the receiving element useless.

Many different means of solving donor-receiver sticking are known in the art. These include the addition of release agents to the dye-donor element or the receiver element. Use of silicone waxes and oils as lubricating elements are known in the art, as disclosed, for example, in JP 04-255394, and U.S. Pat. No. 4,643,917 to Koshizuka.

Use of dimethyl siloxanes is also known in the art. U.S. Pat. No. 5,356,859 to Lum et al. discloses the use of a dye image-receiving element including a polyoxyalkylene-modified dimethylsiloxane graft copolymer. However, the use of such material in high temperature extrusion coating of dye receiving layers is difficult because these materials degrade at high temperatures, resulting in unwanted reactions with other components of the dye-receiving layer. U.S. Pat. No. 4,839,338 to Marbrow discloses use of a receiver element coated with a release medium including two polysiloxanes which exhibit the same degradation and unwanted reactions as the materials in Lum. JP 61-262189 discloses the use of polyoxyalkylene silicone copolymers as a release material for use in heat sensitive recording materials, particularly where the polyoxyalkylene is grafted into the polysiloxane backbone for use in very high power printers. Release agents such as those listed above can affect the quality of the image printed on the dye image-receiving layer, and can be unsuitable for use in certain receiver elements, such as those prepared by extrusion coating of the dye image-receiving layer.

Various release agents have been found to exhibit decreased effectiveness when added to an extruded dye image-receiving layer. The release agents of the prior art can cause cross-linking and degradation of the extruded polymer mixture at the high temperatures used during extrusion, resulting in decreased image quality, such as the appearance of lines and streaks.

It is known to use phenol-based stabilizers and antioxidants, for example, alpha-tocopherol, to increase stability in extruded polyolefin compositions used for packaging material, for example, as described in U.S. Pat. Nos. 6,451,423, and 6,448,357. These compositions are not suitable for use in extruded thermal receivers.

There is a need in the art for a means to reduce or eliminate donor-receiver sticking, while reducing amounts of additives in a receiver element, and maintaining good print image formation. There is also a need to provide a receiver element capable of formation by extrusion coating to reduce costs. There is an additional need for stabilization, for example, at extrusion temperatures, in oxidative conditions, or both. Additives suitable for use in extruded thermal receivers are desirably capable of reducing donor-receiver sticking, improving coating quality, and are thermally stable.

SUMMARY

A receiver element is disclosed, wherein the receiver comprises a support and a dye-receiving layer, wherein the dye-receiving layer comprises a polymer, an optional release agent, and alpha-tocopherol or a derivative thereof.

DETAILED DESCRIPTION

Figure 1:
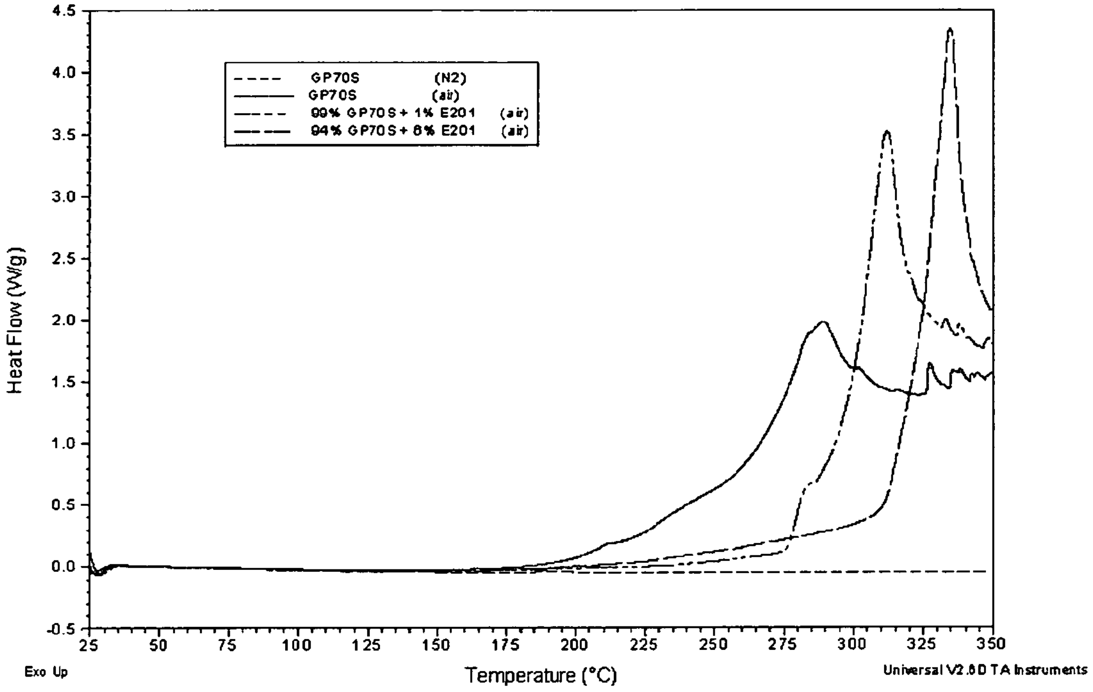
FIG. 1 depicts Differential Scanning Calorimetry curves of the compositions of Example 2.

According to various embodiments, a receiver element having a dye-receiving layer including alpha-tocopherol can reduce or eliminate donor-receiver sticking while maintaining good image properties. As used herein throughout, "sticking" refers to adherence of a dye-donor element to a receiver element. Sticking can be detected by resultant defects in the dye-donor element or receiver element. For example, sticking can cause a removal of dye from the dye-donor element, appearing as a clear spot on the dye-donor element, or an over-abundance of dye on the receiver element. Sticking also can cause an uneven or spotty appearance on the dye-donor element. "Gross sticking" is when the dye-donor layer of the dye-donor element is pulled off of the support layer and sticks to the receiver element. This can appear as uneven and randomized spots across the dye-donor element and receiver element. "Microsticking" results in an undesirable image where a small area of the dye-donor element and receiver element stick together. Microsticking can be observed with a magnifying glass or microscope.

Receiver elements useful in this invention for image transfer can be used in thermal printing systems, electrostatic printing systems, and electrophotographic systems. Thermal printing systems can include thermal transfer of dye or colorant by sublimation, diffusion, or mass transfer processes.

The support for the receiver element can be a transparent film, for example, a poly(ether sulfone), a polyimide, a cellulose ester such as cellulose acetate, a poly(vinyl alcohol-co-acetal), or a poly(ethylene terephthalate). The support can be a reflective layer, for example, baryta-coated paper, white polyester (polyester with white pigment incorporated therein), an ivory paper, a condenser paper, or a synthetic paper, for example, DuPont Tyvek® by E.I. DuPont de Nemours and Company. The support can be employed at any desired thickness, for example, from 10 μm to 1000 μm. Exemplary supports for the dye image-receiving layer are disclosed in commonly assigned U.S. Pat. Nos. 5,244,861 and 5,928,990, and in EP-A-0671281. Other suitable supports as known to practitioners in the art can also be used, and can be chosen dependent on the image transfer system being used.

According to various embodiments, the support can be a composite or laminate structure comprising a base layer and one or more additional layers. The additional layers can include a tie-layer, an adhesive layer, an antistatic layer, a backing layer, a slip layer, or a combination thereof. The base layer can comprise more than one material, for example, a combination of one or more of a microvoided layer, a non-voided layer, a synthetic paper, a natural paper, and a polymer.

The dye image-receiving layer can comprise a polymeric material chosen for its compatibility and receptivity for the dyes to be transferred from a dye-donor element. During printing, a dye can migrate rapidly from a dye-donor layer into the dye image-receiving layer during the dye transfer step. The dye image-receiving layer composition can immobilize the dye and stabilize the dye in an intended viewing environment.

The dye image-receiving layer can include a thermoplastic material, for example, a polyester, a polyolefin, a polycarbonate, a vinyl polymer, a polyurethane, a polyvinyl chloride, a poly(styrene-co-acrylonitrile), a poly(caprolactone), or combinations thereof, such as blends or copolymers.

Polyester-polycarbonate blends suitable for the dye image-receiving layer can include unmodified bisphenol-A polycarbonates having a number molecular weight of at least 25,000, such as those disclosed in U.S. Pat. No. 4,695,286. Specific examples include MAKROLON 5700 (Bayer AG) and LEXAN 151 (General Electric Co.) polycarbonates.

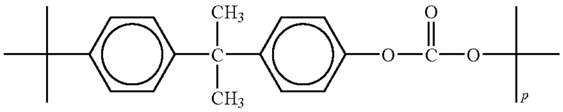

Lexan® 151: p ~ 120, Tg ~ 150° C.
Makrolon® 5700: p ~ 280, Tg ~ 157° C.

For polyester-polycarbonate blends, the polycarbonate can have a Tg of from 100° C. to 250° C., and the polyester can have a lower Tg than the polycarbonate. The Tg of the final polyester-polycarbonate blend can be between 40° C. and 100° C. Higher Tg polyester and polycarbonate polymers also can be useful.

According to various embodiments, the dye image-receiving layer can include a polyester having recurring dibasic acid derived units and diol derived units. A portion of the dibasic acid derived units, for example, at least 50 mole %, can include dicarboxylic acid derived units having an alicyclic ring within two carbon atoms of each carboxyl group of the corresponding dicarboxylic acid. A portion of the diol derived units, for example, at least 30 mole %, can have an aromatic ring not immediately adjacent to each hydroxyl group of the corresponding diol, or an alicyclic ring. Examples of such polyesters suitable for dye image-receiving layers include polyesters such as those found in U.S. Pat. No. 5,387,571.

In the case of an extrudable polyester, monomers (as a replacement for either a diacid and/or diol that has three or more functional groups, preferably one more multifunctional polyols or polyacids, and derivatives thereof) that can provide branching can be used, for example, multifunctional polyols, including but not limited to, glycerin, 1,1,1-trimethylolethane, 1,1,1-trimethylolpropane, and combinations thereof. Polyacids having more than two carboxylic acid groups (including esters or anhydrides derivatives thereof) include, for example, trimellitic acid, trimesic acid, 1,2,5-, 2,3,6- or 1,8, 4-naphthalene tricarboxylic anhydride, 3,4,4'-diphenyltricarboxylic anhydride, 3,4,4'-diphenylmethanetricarboxylic anhydride, 3,4,4'-diphenylethertricarboxylic anhydride, 3,4, 4'-benzophenonetricarboxylic anhydride acid, and derivatives thereof. Multifunctional polyols or anhydrides, for example, include compounds represented by the following structures:

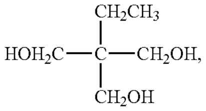

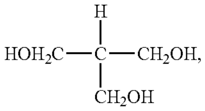

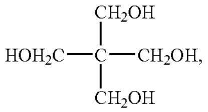

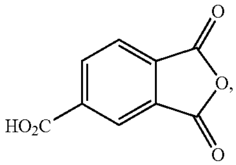

and

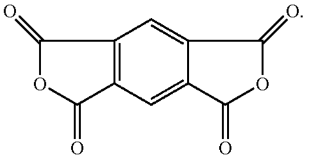

Examples of such extrudable branched polyesters include, for example, 1,4-cyclohexanedicarboxylic acid, 1,4-cyclohexanedimethanol, 4,4'-bis(2-hydroxyethyl)bisphenol-A, and 2-ethyl-2-(hydroxymethyl)-1,3-propanediol.

Various polymerization catalysts known to practitioners in the art can be used to make the polymers, for example, polyesters, for the dye-receiving layer. For example, a catalyst can be added in the amount of from 0.01% to 0.08% by weight solids to the polymer composition of the dye image-receiving layer to prevent or minimize transesterification.

A plasticizer can be present in the dye image-receiving layer in any effective amount. For example, the plasticizer can be present in an amount of from 5% to 100%, or from 4% to 30%, based on the weight of the polymer in the dye-receiving layer. According to various embodiments, an aliphatic ester plasticizer can be used in the dye-receiving layer. Suitable aliphatic ester plasticizers can include both monomeric esters and polymeric esters. Examples of aliphatic monomeric esters include ditridecyl phthalate, dicyclohexyl phthalate, and dioctylsebacate. Examples of aliphatic polyesters include polycaprolactone, poly(butylene adipate) and poly(hexamethylene sebacate). Various aliphatic ester plasticizer, including polyesters or monomeric esters, are disclosed in U.S. Pat. No. 6,291,396. Phthalate ester plasticizers are disclosed in U.S. Pat. No. 4,871,715.

When the dye image-receiving layer is made by high temperature melt extrusion, a phosphorous-containing stabilizer can be added to the dye image-receiving layer to prevent degradation of the polyester polymer blend during extrusion. The phosphorous-containing stabilizer can be a phosphorous acid, an organic diphosphite such as bis(2-ethylhexyl)phosphite, a phosphate, an alkyl phosphate, an aryl phosphate, an inorganic phosphate, a phosphoric acid ester, or a phosphorous acid. The phosphorous stabilizer can be combined with a plasticizer such as dioctyl sebacate or the like. To improve compatibility, the plasticizer can be combined with the stabilizer prior to combining both with other components of the dye image-receiving layer.

The dye-receiving layer can include a release agent such as a modified polydimethylsiloxane. Suitable release agents are known in the art, and can include, for example, those described in U.S. patent application Ser. No. 10/729,567 to Kung et al., of the formula:

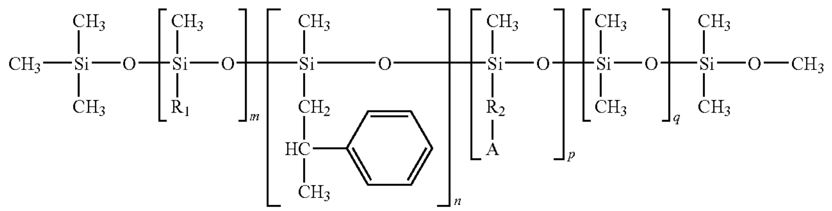

wherein $R_1$ is an alkyl chain of $C_9H_{19}$ or greater; $R_2$ is an alkyl chain of $C_3H_6$ or greater; A is NH—$R_3$, $NHNH_2$, NHCO—$R_3$, NH—$R_4$—$NH_2$, or NHCO—$R_4$—$NH_2$; $R_3$ is an alkyl chain of $C_2H_5$ or greater; $R_4$ is an alkyl chain of $C_2H_4$ or greater; m is from 0 to 95 weight percent; n is from 0 to 70 weight percent; p is from 0 to 40 weight percent; and q is from 0 to 95 weight percent, with the proviso that when m is 0, then n is 0, otherwise when m is greater than 0, n is from 0.1 to 70 weight percent, based on the total weight of the release agent. According to various embodiments, m can be from 20 to 80 weight percent, n can be from 1 to 80 weight percent, more preferably from 20 to 80 weight percent, and p can be from 20 to 40 weight percent when n and m are both 0, or any combination thereof. $R_1$, $R_2$, $R_3$ and $R_4$ can each independently be selected from straight or branched alkyl chains, except that when m and n are both 0, $R_3$ is an alkyl chain of $C_8H_{17}$ or greater. Suitable release agents can include, for example, GP-7101, GP-7105, GP-70-S, GP-74, and GP-154, all available from Genesee Polymers, Flint, Mich. Other suitable release agents can include, for example, those disclosed in U.S. Pat. Nos. 4,820,687 and 4,695,286, Silwet L-7230 and Silwet L-7001 from Crompton Corporation of Long Reach, W. Va., USA, and solid polydimethylsiloxanes such as but not limited to MB50-315 silicone, a 50:50 blend of bisphenol-A polycarbonate and ultrahigh MW polydimethyl siloxane, from Dow Corning of Midland, Mich., USA.

If present, the release agent can be present in the dye-receiving layer in an amount of greater than or equal to $5.5\times10^{-4}$ g/m$^2$. For example, the release agent can be present in an amount of greater than or equal to 0.001 g/m$^2$, from $5.5\times10^{-4}$ g/m$^2$ to 0.045 g/m$^2$, from $5.5\times10^{-4}$ g/m$^2$ to 0.02 g/m$^2$, or from 0.001 g/m$^2$ to 0.01 g/m$^2$.

The release agent can be present in one or more layers of the receiver element. For example, the release agent can be present in the dye image-receiving layer, a support, an adhesive layer, a tie-layer, an antistatic layer, or any other layer of the receiver element. When the support is a composite or laminate structure, the release agent can be in one or more layers of the support, for example, a base layer, a tie-layer, an adhesive layer, or a backing layer. According to various embodiments, the release agent can be in a layer between the base layer of the support and the dye image-receiving layer.

The dye-receiving layer can include alpha-tocopherol or a derivative thereof. An example of alpha-tocopherol is Vitamin E, available as Irganox® E201 from Ciba Specialty Chemicals, Inc., Tarrytown, N.Y. Alpha-tocopherol is known as 2,5,7,8,-tetramethyl-2-4(4',8',12'-trimethyltridecyl)-6-chromanol. Derivatives can include, for example, alpha-tocopherol acetates. Alpha-tocopherol can be present in an amount of at least 0.001 weight percent of the dye-receiving layer, for example, from 0.005 to 10 weight percent, from 0.01 to 2.0 weight percent, from 0.01 to 0.4 weight percent, or from 0.05 to 0.2 weight percent.

The release agent and alpha-tocopherol or a derivative thereof can be present in the dye-receiving layer in a ratio of from 100:1 to 1:1 by weight percent, for example, from 80:1 to 2:1, or from 16:1 to 4:1. The ratio will depend on the materials present in the dye-receiving layer. If the amount of alpha-tocopherol is too low, streaking and lines can occur on the dye-receiving layer. If the amount of alpha-tocopherol is too high, the Dmin of the receiver can become unacceptable for the desired application.

When used as a stabilizer and/or without the presence of a release agent, alpha-tocopherol or a derivative thereof can be present in the amounts indicated herein. Greater or lesser amounts can be used as needed, and can be determined by practitioners in the art.

The dye-receiving layer can be present in an amount which is effective for its intended purpose. For example, the dye-receiving layer can be in a concentration of from 0.5 g/m$^2$ to 20 g/m$^2$, 1.0 g/m$^2$ to 15 g/m$^2$, or 3.0 g/m$^2$ to 10 g/m$^2$. The dye-receiving layer can be present on one or both sides of the support.

The dye-receiving layer can be formed on the support by any method known to practitioners in the art, including but not limited to printing, solution coating, dip coating, and extrusion coating. If the dye image-receiving layer is made by extrusion coating, and the layer includes the release agent, the release agent is of the formula wherein p is 0. When the dye-receiving layer is extruded, the process can include (a) forming a melt comprising a thermoplastic material; (b) extruding or coextruding the melt as a single-layer film or a layer of a composite (multilayer or laminate) film; and (c) applying the extruded film to the support for the receiver element. In step (b), the melt can be extruded and cast as a film or laminate film at any desired thickness, for example, a thickness of at least 100 microns, for example, 100 to 800 microns, and then uniaxially or biaxially stretched to less than 10 microns, for example, 3-4 microns. The extruded uniaxially or biaxially stretched film can be applied to the support, for example, a moving web. Examples of suitable extruded dye-receiving layers include those disclosed in U.S. Pat. Nos. 5,387,571 and 5,302,574. According to various embodiments, a tie-layer can be used for adhering the extruded dye-receiving layer to the support.

According to various embodiments, the receiver element can include a tie-layer between the support and the dye image-receiving layer. The tie-layer can be a conventional material capable of adhering the support and dye image-receiving layer together. The tie-layer can comprise a thermoplastic polymer having preselected antistatic properties, adhesive properties, or viscoelastic properties.

According to various embodiments, the tie-layer can have viscoelastic properties such that the viscosity is not more than 10 times or less than 1/10, or not more than 3 times or less than 1/3, that of the dye-receiving layer.

According to various embodiments, the tie-layer can have antistatic properties. Suitable materials for use as the antistatic tie-layer include PELLESTAT 300 polymer, commercially available from Sanyo Chemical Industries, Ltd. (Tokyo) or Tomen America, Inc. (New York, N.Y.), PEBAX copolymer, commercially available from Atofina (Finland), polymers disclosed in EP-A-1,167,425, and other polymers as known to practitioners in the art.

Other materials known in the art that can be melt processed while retaining their antistatic activity and overall physical performance are various polymeric substances containing a high concentration of polyether blocks. Ionic conduction along the polyether chains can make these polymers inherently dissipative. Exemplary ionic conductors can include polyether-block-copolyamide (U.S. Pat. Nos. 4,115,475; 4,195,015; 4,331,786; 4,839,441; 4,864,014; 4,230,838; 4,332,920; and 5,840,807), polyetheresteramide (U.S. Pat. Nos. 5,604,284; 5,652,326; 5,886,098), and a thermoplastic polyurethane containing a polyalkylene glycol moiety (U.S. Pat. Nos. 5,159,053 and 5,863,466). Such inherently dissipative polymers (IDPs) have been shown to be thermally stable and readily processable in the melt state in their neat form, or in blends with other thermoplastic materials. Other known inherently conductive polymers (ICPs), for example, polyaniline, polypyrrole, and polythiophene, can be sufficiently thermally stable if a compatibilizer is added.

According to various embodiments, the antistatic tie-layer and the dye-receiving layer can be coextruded. For example, a first melt and a second melt can be formed, wherein the first melt comprises a polymer for the dye image-receiving layer and the second melt comprises the thermoplastic antistatic polymer having desirable adhesive and viscoelastic properties. The coextruded layers, or composite film, can be stretched to reduce the thickness. The extruded and stretched film can be applied to a support of the receiver element at a temperature below the Tg of the dye image-receiving layer. According to various embodiments, this can be done by quenching the extruded film between two nip rollers.

According to various embodiments wherein the tie-layer and dye image-receiving layer are coextruded, a compatibilizer layer can be added to ensure compability between the layers by controlling phase separation. Exemplary compatibilizers can include those described in U.S. Pat. No. 6,436,619, EP-A-0,342,066, and EP-A-0,218,665. Further examples of compatibilizers can include, but are not limited to: polyethylene, polypropylene, ethylene/propylene copolymers, ethylene/butene copolymers, grafts of the above with maleic anhydride or glycidyl methacrylate; ethylene/alkyl (meth)acrylate/maleic anhydride copolymers, the maleic anhydride being grafted or copolymerized; ethylene/vinyl acetate/maleic anhydride copolymers, the maleic anhydride being grafted or copolymerized; the two above copolymers in which anhydride is replaced fully or partly by glycidyl methacrylate; ethylene/(meth)acrylic acid copolymers and their salts; ethylene/alkyl (meth)acrylate/glycidyl methacrylate copolymers, the glycidyl methacrylate being grafted or copolymerized; and grafted copolymers constituted by at least one mono-amino oligomer of polyamide and of an alpha-mono-olefin (co)polymer grafted with a monomer able to react with the amino functions of said oligomer. Other exemplary compatibilizers can include terpolymers of ethylene/methyl acrylate/glycidyl methacrylate and copolymers of ethylene/glycidyl methacrylate, commercially available as LOTADER from Atofina, or maleic anhydride grafted or copolymerized polyolefins such as polypropylene, or polyethylene, commercially available as OREVAC from Atofina.

The dye-donor element suitable for use with the receiver element described herein can include a dye-donor layer suitable for thermal printing. The dye-donor layer can include one or more colored areas (patches) containing dyes suitable for thermal, electrostatic, or electrophotographic printing. As used herein, a “dye” can be one or more dye, pigment, colorant, or a combination thereof, and can optionally be in a binder or carrier as known to practitioners in the art. During thermal printing, at least a portion of one or more colored areas can be transferred to the receiver element, forming a colored image on the receiver element. The dye-donor layer can include a laminate area (patch) having no dye. The laminate area can follow one or more colored areas. During thermal printing, the entire laminate area can be transferred to the receiver element. The dye-donor layer can include one or more colored areas and one or more laminate areas. For example, the dye-donor layer can include three color patches, for example, yellow, magenta, and cyan, and a clear laminate patch, for forming a three color image with a protective laminate layer on a receiver element.

Any dye transferable by heat can be used in the dye-donor layer of the dye-donor element. The dye can be selected by taking into consideration hue, lightfastness, and solubility of the dye in the dye donor layer binder and the dye image receiving layer binder. Examples of suitable dyes can include, but are not limited to, diarylmethane dyes; triarylmethane dyes; thiazole dyes, such as 5-arylisothiazole azo dyes; methine dyes such as merocyanine dyes, for example, aminopyrazolone merocyanine dyes; azomethine dyes such as indoaniline, acetophenoneazomethine, pyrazoloazomethine, imidazoleazomethine, imidazoazomethine, pyridoneazomethine, and tricyanopropene azomethine dyes; xanthene dyes; oxazine dyes; cyanomethylene dyes such as dicyanostyrene and tricyanostyrene dyes; thiazine dyes; azine dyes; acridine dyes; azo dyes such as benzeneazo, pyridoneazo, thiopheneazo, isothiazoleazo, pyrroleazo, pyrraleazo, imidazoleazo, thiadiazoleazo, triazoleazo, and disazo dyes; arylidene dyes such as alpha-cyano arylidene pyrazolone and aminopyrazolone arylidene dyes; spiropyran dyes; indolinospiropyran dyes; fluoran dyes; rhodaminelactam dyes; naphthoquinone dyes, such as 2-carbamoyl-4-[N-(p-substituted aminoaryl) imino]-1,4-naphthaquinone; anthraquinone dyes; and quinophthalone dyes. Specific examples of dyes usable herein can include:

C.I. (color index) Disperse Yellow 51, 3, 54, 79, 60, 23, 7, and 141;
C.I. Disperse Blue 24, 56, 14, 301, 334, 165, 19, 72, 87, 287, 154, 26, and 354;
C.I. Disperse Red 135, 146, 59, 1, 73, 60, and 167;
C.I. Disperse Orange 149;
C.I. Disperse Violet 4, 13, 26, 36, 56, and 31;
C.I. Disperse Yellow 56, 14, 16, 29, 201 and 231;
C.I. Solvent Blue 70, 35, 63, 36, 50, 49, 111, 105, 97, and 11;
C.I. Solvent Red 135, 81, 18, 25, 19, 23, 24, 143, 146, and 182;
C.I. Solvent Violet 13;
C.I. Solvent Black 3;

C.I. Solvent Yellow 93; and

C.I. Solvent Green 3.

Further examples of sublimable or diffusible dyes that can be used include anthraquinone dyes, such as Sumikalon Violet RS® (product of Sumitomo Chemical Co., Ltd.), Dianix Fast Violet 3R—FS® (product of Mitsubishi Chemical Corporation.), and Kayalon Polyol Brilliant Blue N-BGM® and KST Black 146® (products of Nippon Kayaku Co., Ltd.); azo dyes such as Kayalon Polyol Brilliant Blue BM®, Kayalon Polyol Dark Blue 2BM®, and KST Black KR® (products of Nippon Kayaku Co., Ltd.), Sumickaron Diazo Black 5G® (product of Sumitomo Chemical Co., Ltd.), and Miktazol Black 5GH® (product of Mitsui Toatsu Chemicals, Inc.); direct dyes such as Direct Dark Green B® (product of Mitsubishi Chemical Corporation) and Direct Brown M® and Direct Fast Black D® (products of Nippon Kayaku Co. Ltd.); acid dyes such as Kayanol Milling Cyanine 5R® (product of Nippon Kayaku Co. Ltd.); and basic dyes such as Sumicacryl Blue 6G® (product of Sumitomo Chemical Co., Ltd.), and Aizen Malachite Green® (product of Hodogaya Chemical Co., Ltd.); magenta dyes of the structures

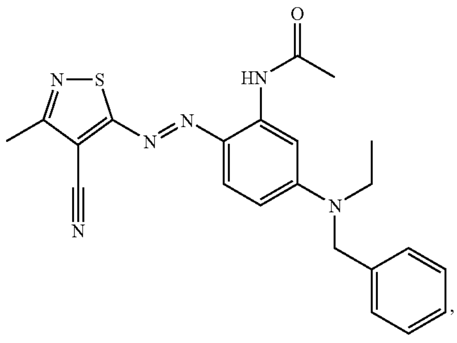

,

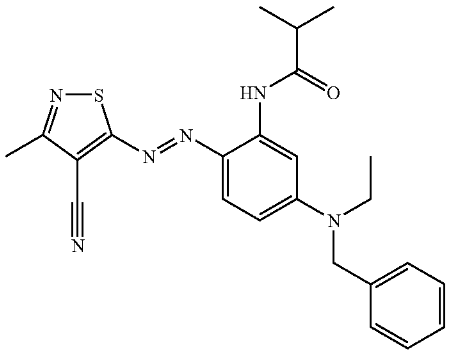

,

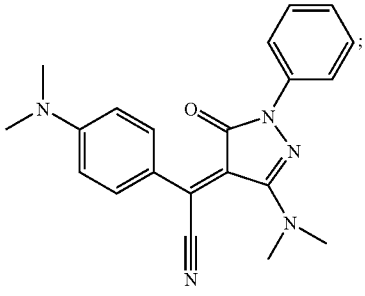

; and cyan dyes of the structures

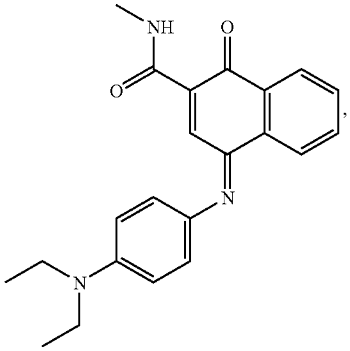

,

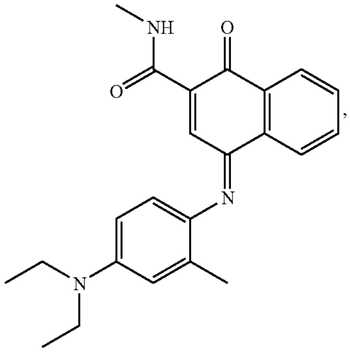

,

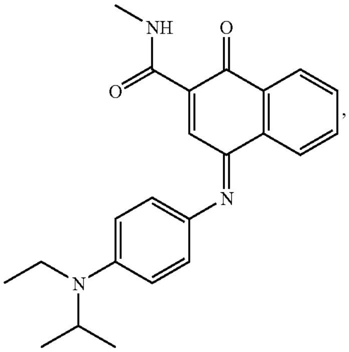

, and

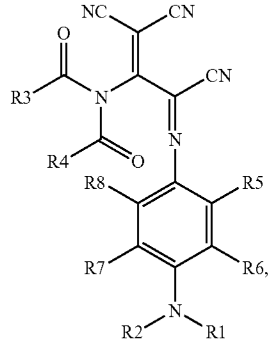

where R1 and R2 each independently represents an alkyl group, a cycloalkyl group, an aryl group, a heterocyclic group, or R1 and R2 together represent the necessary atoms to close a heterocyclic ring, or R1 and/or R2 together with R6 and/or R7 represent the necessary atoms to close a heterocyclic ring fused on the benzene ring; R3 and R4 each independently represents an alkyl group, or an alkoxy group; R5, R6, R7 and R8 each independently represents hydrogen, an alkyl group, a cycloalkyl group, an aryl group, an alkoxy group, an aryloxy group, a carbonamido group, a sulfamido group, hydroxy, halogen, $NHSO_2R_9$, $NHCOR_9$, $OSO_2R_9$, or $OCOR_9$, or R5 and R6 together and/or R7 and R8 together represent the necessary atoms to close one or more heterocyclic ring fused on the benzene ring, or R6 and/or R7 together with R1 and/or R2 represent the necessary atoms to close a heterocyclic ring fused on the benzene ring; and R9 represents an alkyl group, a cycloalkyl group, an aryl group and a heterocyclic group; and yellow dyes of the structures

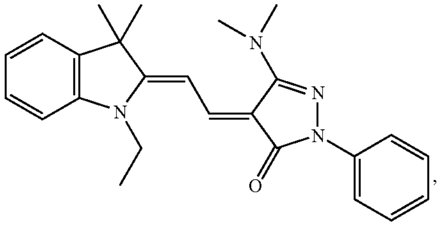

, and

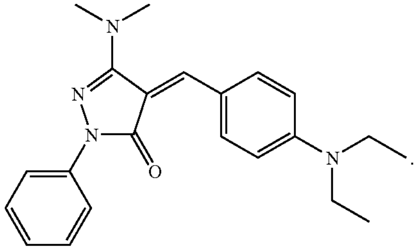

.

Further examples of useful dyes can be found in U.S. Pat. Nos. 4,541,830; 5,026,677; 5,101,035; 5,142,089; 5,804,531; and 6,265,345, and U.S. Patent Application Publication No. US 20030181331. Suitable cyan dyes can include Kayaset Blue 714 (Solvent Blue 63, manufactured by Nippon Kayaku Co., Ltd.), Phorone Brilliant Blue S-R (Disperse Blue 354, manufactured by Sandoz K.K.), and Waxoline AP-FW (Solvent Blue 36, manufactured by ICI). Suitable magenta dyes can include MS Red G (Disperse Red 60, manufactured by Mitsui Toatsu Chemicals, Inc.), and Macrolex Violet R (Disperse Violet 26, manufactured by Bayer). Suitable yellow dyes can include Phorone Brilliant Yellow S-6 GL (Disperse Yellow 231, manufactured by Sandoz K.K.) and Macrolex Yellow 6G (Disperse Yellow 201, manufactured by Bayer). The dyes can be employed singly or in combination to obtain a monochrome dye-donor layer or a black dye-donor layer. The dyes can be used in an amount of from 0.05 $g/m^2$ to 1 $g/m^2$ of coverage. According to various embodiments, the dyes can be hydrophobic.

Dyes suitable for use herein are chosen in combination with a binder in the dye-donor layer of the donor element and in combination with a polymer of the dye-receiving layer of the receiver element, such that the receiver/donor dye partition coefficient between the dye in the dye-donor layer of the donor element and the dye in the dye-receiving layer of the receiver element is 2.5 or greater.

Each dye-donor layer patch can range from 20 wt. % to 90 wt. % dye, relative to the total dry weight of all components in the layer. A high amount of dye is desirable for increased efficiency, but higher amounts of dye can lead to increased occurrences of donor/receiver sticking. Depending on the efficiency of the dye-donor layer, a lower amount of dye can be used to achieve the same efficiency as a different dye-donor layer. The dye percent is ideally chosen in view of the specific donor and receiver combination. Varying the amount of dye in the donor can aid in matching the efficiency between different dye patches, for example, a cyan, magenta, and yellow patch. For example, yellow and/or magenta patch dye amounts can be between 20 wt. % and 75 wt. % dye relative to the total dry weight of all components in the layer, for example, between 30 wt. % and 50 wt. %. A cyan patch dye amount can be between 40 wt. % and 90 wt. % dye relative to the total dry weight of all components in the layer, for example, between 55 wt. % and 75 wt. %.

To form a dye-donor layer, one or more dyes can be dispersed in a polymeric binder, for example, polycarbonate; poly(styrene-co-acrylonitrile); poly(sulfone); poly(phenylene oxide); polystyrene; phenoxy resin; acrylic resin such as poly(methyl acrylate), poly(methyl methacrylate), and poly(butyl methacrylate); poly(vinyl acetate); cellulose derivatives such as but not limited to cellulose acetate hydrogen phthalate, cellulose acetate, cellulose acetate propionate, cellulose acetate butyrate, or cellulose triacetate; a hydroxyalkyl cellulose, such as hydroxypropyl cellulose, methylhydroxypropyl cellulose, hydroxypropylmethyl cellulose; polyacetals; poly(vinyl butyral); poly(vinyl pental); polyvinylhexal; poly(vinyl heptal); ethyl cellulose; or a combination thereof. The binder can be used in an amount of from 0.05 $g/m^2$ to 5 $g/m^2$.

The dye-donor layer can be formed or coated on a support. The dye-donor layer can be formed on the support by a printing technique such as but not limited to a gravure process, spin-coating, solvent-coating, extrusion coating, or other methods known to practitioners in the art.

The support can be formed of any material capable of withstanding the heat of thermal printing. According to various embodiments, the support can be dimensionally stable during printing. Suitable materials can include polyesters, for example, poly(ethylene terephthalate) and poly(ethylene naphthalate); polyamides; polycarbonates; glassine paper; condenser paper; cellulose esters, for example, cellulose acetate; fluorine polymers, for example, polyvinylidene fluoride, and poly(tetrafluoroethylene-co-hexafluoropropylene); polyethers, for example, polyoxymethylene; polyacetals; polystyrenes; polyolefins, for example, polyethylene, polypropylene, and methylpentane polymers; polyimides, for example, polyimide-amides and polyether-imides; and combinations thereof. The support can have a thickness of from 1 μm to 30 μm, for example, from 3 μm to 7 μm.

According to various embodiments, a subbing layer, for example, an adhesive or tie layer, a dye-barrier layer, or a combination thereof, can be coated between the support and the dye-donor layer. The adhesive or tie layer can adhere the dye-donor layer to the support. Suitable adhesives are known to practitioners in the art, for example, Tyzor TBT® from E.I. DuPont de Neumours and Company. The dye-barrier layer can include a hydrophilic polymer. The dye-barrier layer can provide improved dye transfer densities.

The dye-donor element can also include a slip layer capable of preventing the print head from sticking to the dye-donor element. The slip layer can be coated on a side of the support opposite the dye-donor layer. The slip layer can include a lubricating material, for example, a surface-active agent, a liquid lubricant, a solid lubricant, or mixtures thereof, with or without a polymeric binder. Suitable lubricating materials can include oils or semi-crystalline organic solids that melt below 100° C., for example, poly(vinyl stearate), beeswax, perfluorinated alkyl ester polyether, poly(caprolactone), carbowax, polyethylene homopolymer, or poly(ethylene glycol). Suitable polymeric binders for the slip layer can include poly(vinyl alcohol-co-butyral), poly(vinyl alcohol-co-acetal), poly(styrene), poly(vinyl acetate), cellulose acetate butyrate, cellulose acetate, ethyl cellulose, and other binders as known to practitioners in the art. The amount of lubricating material used in the slip layer is dependent, at least in part, upon the type of lubricating material, but can be in the range of from 0.001 to 2 $g/m^2$, although less or more lubricating material can be used as needed. If a polymeric binder is used, the lubricating material can be present in a range of 0.1 to 50 weight %, preferably 0.5 to 40 weight %, of the polymeric binder.

The dye-donor element can include a release agent in one or more layers to aid in reducing donor-receiver sticking. Release agents as known to practitioners in the art can be added for example, to the dye-donor layer, the slip layer, or both. Suitable release agents include those described in U.S. Pat. Nos. 4,740,496 and 5,763,358. Other release agents are set forth in U.S. patent application Ser. No. 10/667,065 for “Thermal Donor for High Speed Printing,” and U.S. patent application Ser. No. 10/729,215 for “Thermal Printing Assembly,” all to David G. Foster et al. According to various embodiments, the dye-donor element can include the same release agent as the receiver element.

The dye-donor element can also include one or more plasticizers. Suitable plasticizers can include compounds having a glass transition temperature ($T_g$) less than 25° C., a melting point ($T_m$) less than 25° C., or both. Plasticizers useful for this invention can include low molecular weight plasticizers and higher molecular weight plasticizers such as oligomeric or polymeric plasticizers. Examples of suitable plasticizers can include aliphatic polyesters, epoxidized oils, chlorinated hydrocarbons, poly(ethylene glycols), poly(propylene glycols), and poly(vinyl ethyl ether) (PVEE). The molecular weight of the plasticizer can be greater than or equal to 450 to minimize transfer of the plasticizer to the dye receiving layer during printing. Transfer of some plasticizers to the dye receiving layer can result in image keeping and stability problems. The plasticizer can be present in an amount of from 1 to 50%, for example, from 5% to 35%, by weight of the binder.

The dye-donor layer can include beads. The beads can have a particle size of from 0.5 to 20 microns, preferably from 2.0 to 15 microns. The beads can act as spacer beads under the compression force of a wound up dye-donor roll, improving raw stock keeping of the dye-donor roll by reducing the material transferred from the dye-donor layer to the slipping layer, as measured by the change in sensitometry under accelerated aging conditions, or the appearance of unwanted dye in the laminate layer, or from the backside of the dye-donor element, for example, a slipping layer, to the dye-donor layer. The use of the beads can result in reduced mottle and improved image quality. The beads can be employed in any amount effective for the intended purpose. In general, good results have been obtained at a coverage of from 0.003 to 0.20 g/m$^2$. Beads suitable for the dye-donor layer can also be used in the slip layer.

The dye-donor element can be a sheet of one or more colored patches or laminate, or a continuous roll or ribbon. The continuous roll or ribbon can include one patch of a monochromatic color or laminate, or can have alternating areas of different patches, for example, one or more dye patches of cyan, magenta, yellow, or black, one or more laminate patches, or a combination thereof.

The dye-donor element and receiver element described herein, when placed in superimposed relationship such that the dye-donor layer of the dye-donor element is adjacent the dye image-receiving layer of the receiver element, can form a print assembly. An image can be formed by passing the print assembly past a print head, wherein the print head is located on the side of the dye-donor element opposite the receiver element. The print head can apply heat image-wise to the dye-donor element, causing the dyes in the dye-donor layer to transfer to the dye image-receiving layer of the receiver element. Thermal print heads that can be used with the print assembly are available commercially and known to practitioners in the art. Exemplary thermal print heads can include, but are not limited to, a Fujitsu Thermal Head (FTP-040 MCSOO1), a TDK Thermal Head F415 HH7-1089, a Rohm Thermal Head KE 2008-F3, a Shinko head (TH300U162P-001), and Toshiba heads (TPH162R1 and TPH207R1A).

When multiple color images are to be obtained, the print assembly is formed as many times as there are colors to be printed during the time when heat is applied by the thermal print head. After the first dye is transferred from a first dye-donor element, the dye-donor element and receiver element can be peeled apart. A second dye-donor element (or another area of the dye-donor element with a different dye) can be brought into register with the receiver element and the process can be repeated until all colors are printed. A laminate patch can also be printed on the image in this manner to protect the image.

An improved receiver element including alpha-tocopherol and optionally a release agent as described herein provides reduced donor-receiver sticking, good quality image when used in a print assembly with a dye-donor element, for example, an image with a print density greater than or equal to 1.5, for example, 2.0, and improve thermal and oxidative stability of the dye-receiving layer.

The following examples are provided to further illustrate the invention.

EXAMPLES

Throughout the following examples, PES designates a polyester derived from 1,4-cyclohexanedicarboxylic acid, 1,4-cyclohexanedimethanol, 4,4'-bis(2-hydroxyethyl) bisphenol-A, and 2-ethyl-2-(hydroxymethyl)-1,3-propanediol; PC designates bisphenol A polycarbonate, known as GE Lexan 151, obtained from General Electric Co.; DOS designates dioctyl sebacate; $H_3PO_3$ designates phosphorous acid; and DOP designates dioleatyl phosphite. Irganox 1076, 3114, and E 201 were obtained from Ciba Specialty Chemicals. GP-70-S was obtained from Genesee Polymers of Flint, Mich.

Example 1

Thermal Receiver Elements Were Prepared Using the Following Procedures

Extruded Dye-Receiving Layer:

Dye-receiving layers having the compositions shown in Table 1 were prepared by extrusion coating as set forth below. All compounds set forth in Table 1 are in percent by weight of the dye-receiving layer.

TABLE 1

| Sample | PES | PC | DOS | $H_3PO_3$ | DOP | GP-70-S | Irganox 1076 | Irganox 3114 | Irganox E 201 | Irganox 1076 and E201 |
|---|---|---|---|---|---|---|---|---|---|---|
| C-1 | 74.56 | 19.99 | 5.33 | 0.02 | 0.1 | 0 | | | | |
| C-2 | 73.93 | 19.82 | 5.33 | 0.02 | 0.1 | 0.8 | | | | |
| C-3 | 73.77 | 19.78 | 5.33 | 0.02 | 0.1 | 0.8 | 0.2 | | | |
| C-4 | 73.77 | 19.78 | 5.33 | 0.02 | 0.1 | 0.8 | | 0.2 | | |

TABLE 1-continued

| Sample | PES | PC | DOS | $H_3PO_3$ | DOP | GP-70-S | Irganox 1076 | Irganox 3114 | Irganox E 201 | Irganox 1076 and E201 |
|---|---|---|---|---|---|---|---|---|---|---|
| E-1 | 73.77 | 19.78 | 5.33 | 0.03 | 0.1 | 0.8 | | | 0.1 | |
| E-2 | 73.85 | 19.80 | 5.33 | 0.02 | 0.1 | 0.8 | | | | 0.15/0.05 |

Receiver Element:

Each of the receiver elements was prepared by first extrusion laminating a paper core with a 36-38 μm thick microvoided composite polyolefin film of OPPalyte 350 K18 from ExxonMobil. A backing layer of MLT-70 composite polyolefin film from ExxonMobil was extrusion laminated to a side of the paper core opposite to the microvoided composite film to form a laminated support. An example of forming the support can be found in U.S. Pat. No. 5,244,861.

The composite film side of the resulting laminated support was prepared as follows:

Dye-receiving layers according to the compositions set forth in Table 1 were made by the following method.

PES was dried in a NOVATECH desiccant dryer at 43° C. for 24 hours. The dryer was equipped with a secondary heat exchanger so that the temperature did not exceed 43° C. during the time the desiccant was recharged. The dew point was −40° C. LEXAN 151 polycarbonate from General Electric Co. was dried at 120° C. for 2-4 hours at −40° C. dew point.

Dioctyl Sebecate (DOS) was preheated to 83° C., and then phosphorous acid ($H_3PO_3$) and dioleatyl phosphite (DOP) was added after heating, in amounts according to Table 1. If required by the formulation, additives according to Table 1, such as, GP-70-S, Ciba Irganox 1076, Irganox 3114, and Irganox E 201, were added to the heated dioctyl sebecate/phosphorous acid/DOP solution. This mixture was maintained at 83° C. and mixed for 1 hour under nitrogen before use.

Each of the dye-receiving materials according to Table 1 was subjected to a compounding operation. The compounding was done in a LEISTRITZ ZSK 27 extruder with a 30:1 length to diameter ratio. The LEXAN 151 polycarbonate was introduced into the compounder first, and melted. The heated dioctyl sebecate/phosphorous acid/DOP solution was added, and the PES was added last. A vacuum of slightly negative pressure was then applied to the mixture, and a temperature of 240° C. was maintained. The melted mixture was extruded through a strand die, cooled in 32° C. water, and pelletized. The pelletized dye-receiving layer materials were pre-dried at 35° C. for 24 hours in a NOVATECH dryer, under the conditions described above. The dried pellets were conveyed to an extruder (described below) using desiccated air.

The dye-receiving layer pellets were introduced into a liquid cooled hopper feeding a 6.3 cm single screw BLACK CLAWSON extruder having a 6.3 cm long cooling section in the beginning of the extruder, cooled by 20° C. water. The screw was a standard compression screw with a single mixer. The pellets were melted in the extruder by heating to a temperature of 238° C. The pressure was increased through a melt pump, and the melted composition was pumped to a CLEOREN coextrusion feedblock with AAABB configuration.

A tie-layer was also compounded. PELESTAT 300 antistatic polymer from Sanyo Chemical Co. was predried as described above in the NOVATECH dryer at 77° C. for 24 hours. After drying, the polymer was melt-mixed in the LEISTRITZ ZSK 27 extruder with undried HUNTSMAN P4G2Z-159 polypropylene homopolymer in a 70/30 ratio at about 240° C., then forced through a strand die into 20° C. water and pelletized. The compounded tie-layer pellets were dried again at 77° C. for 24 hours in a NOVATECH dryer, and conveyed by desiccated air to the extruder.

The tie-layer pellets were introduced into a liquid cooled hopper of a second 6.3 cm single screw extruder as described above. The tie-layer pellets were heated to 238° C., and pumped to the CLEOREN coextrusion feedblock.

The volumetric ratio of dye image-receiving layer material to tie-layer material was about 3:1. The dye-receiving layer material and the tie-layer material were brought into intimate contact in the CLOEREN feedblock, and passed to a standard extrusion coating T-die made by Cloeren, having a slot of 0.8 mm, and a land length of 2.5 mm. The die formed a melt curtain traveling 19 cm through the air before being coated onto the laminated support.

The melt curtain was immediately quenched in a nip between a chill roll and the laminated support. The chill roll was operated at 21° C. The thickness of the coated dye-receiving layer was 3 μm, and the thickness of the coated tie-layer was 1 μm. The resultant dye-receiver was wound onto a roll and converted to the necessary dimensions for the thermal printing operation.

Dye-Donor Element:

The dye-donor element was prepared by coating sequential areas of cyan, magenta, and yellow dye in the order recited on 4.5 micron poly(ethylene terephthalate) support. The dye side was prepared by first coating a subbing layer of a titanium alkoxide (DuPont Tyzor TBT®) (0.12 g/m$^2$) from n-propyl acetate and n-butyl alcohol solvent mixture.

The cyan dye patch contained cyan dye #1 at 0.086 g/m$^2$, cyan dye #2 at 0.08 g/m$^2$, and cyan dye #3 at 0.2 g/m$^2$, cellulose acetate propionate binder at 0.21 g/m$^2$, polyester sebacate (Paraplex G-25) at 0.015 g/m$^2$, and divinyl benzene beads at 0.008 g/m$^2$, coated from a solvent mixture containing 70% toluene, 20% methanol, and 5% cyclopentanone.

cyan dye #1

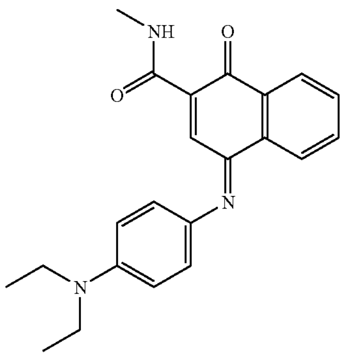

-continued cyan dye #2

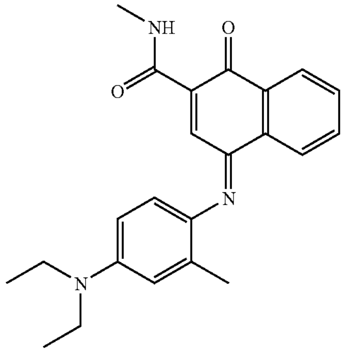

cyan dye #3

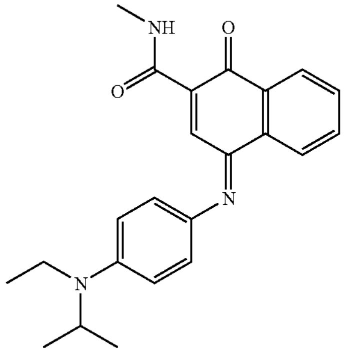

The yellow dye donor patch contained yellow dye #1 at 0.067 g/m$^2$, yellow dye #2 at 0.084 g/m$^2$, cellulose acetate propionate binder at 0.24 g/m$^2$, polyester sebacate (Paraplex G-25) at 0.044 g/m$^2$, and divinyl benzene beads at 0.0034 g/m$^2$, coated from a solvent mixture containing 70% toluene, 20% methanol, and 5% cyclopentanone.

Yellow dye #1

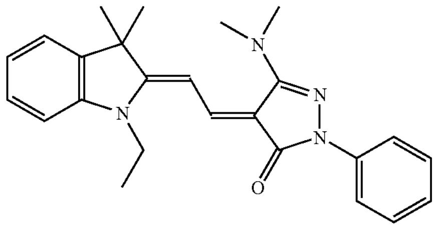

Yellow Dye #2

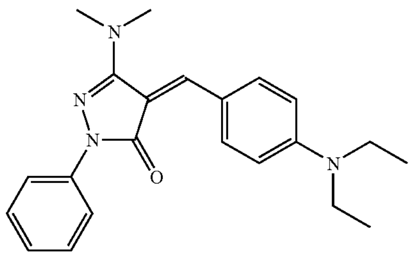

The magenta dye patch contained magenta dye #1 at 0.07 g/m$^2$, magenta dye #2 at 0.14 g/m$^2$, and magenta dye #3 illustrated below at 0.016 g/m$^2$, cellulose acetate propionate binder at 0.29 g/m$^2$, polyester sebacate (Paraplex G-25) at 0.05 g/m$^2$, and divinyl benzene beads at 0.005 g/m$^2$, coated from a solvent mixture containing 70% toluene, 20% methanol, and 5% cyclopentanone.

Magenta dye #1

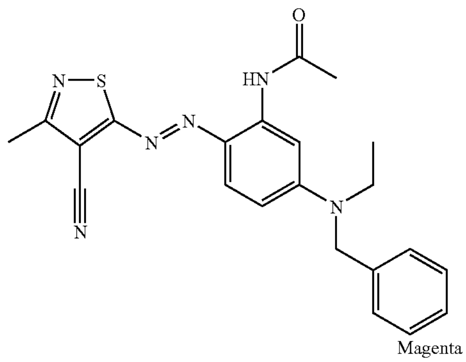

Magenta dye #2

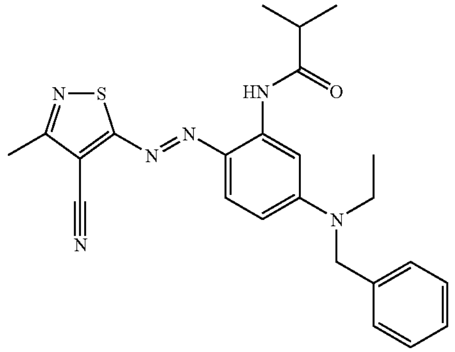

Magenta dye #3

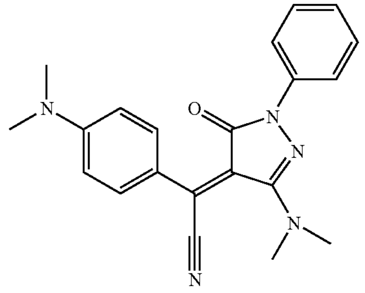

On the reverse side a slipping layer was prepared by coating the following layers in the order recited on 4.5 micron poly(ethylene terephthalate) support. First a subbing layer of a titanium alkoxide (DuPont Tyzor TBT®) (0.12 g/m$^2$) was coated from n-propyl acetate and n-butyl alcohol solvent mixture, then a slipping layer containing an aminopropyl-dimethyl-terminated polydimethylsiloxane, PS513® (United Chemical Technologies) (0.01 g/m$^2$), a poly(vinyl acetal) binder (0.36 g/m$^2$) (Sekisui KS-1), p-toluenesulfonic acid (0.0003 g/m$^2$), candellila wax (0.02 g/m$^2$), and polymethylsisqiloxane (0.05 g/m$^2$), was coated from a solvent mixture of diethylketone, methanol and distilled water (86.5/11.5/2).

Procedure:

The dye-donor element and receiver element were subjected to thermal printing using a Kodak 8670 PS printer from Eastman Kodak Company for donor-receiver sticking performance evaluation. The results are shown in Table 2 below.

The resultant extrusion uniformity of the receiver was visually evaluated. The dye-donor element and receiver were also subjected to thermal printing. The results of extrusion uniformity and donor-receiver sticking of the receiver are shown in Table 2 below.

TABLE 2

| Sample | Donor-receiver Sticking | Extrusion Uniformity |
|---|---|---|
| C-1 | Bad sticking | good |
| C-2 | No sticking | Lines and streaks |
| C-3 | No sticking | Lines and streaks |
| C-4 | No sticking | Lines and streaks |
| E-1 | No sticking | good |
| E-2 | No sticking | good |

A desirable result should comprise a good extrusion uniformity and show no sign of donor-receiver sticking in thermal printing. Comparative Example C-1, though showing good extrusion coating in Table 2, exhibited donor-receiver sticking. The incorporation of GP-70-S in C-2 eliminated the donor-receiver sticking problem, however, it caused poor extrusion coating exemplified by the presence of many unacceptable lines and streaks on the receiver.

Antioxidants, such as, Ciba Irganox 1076, 3114, and E201, were employed to stabilize GP-70-S in high temperature extrusion coating environment. Use of Irganox 1076 and 3114, as shown in C-3 and C-4, resulted in no noticeable improvement in extrusion coating quality, still showing many unacceptable lines and streaks. Unlike the other antioxidants such as those shown in C-3 and C-4, use of Irganox E 201 as shown in E-1 resolved both coating quality and donor-receiver sticking problems simultaneously. E-2, using a mixture of Irganox E201 and 1076, further illustrated the unique effectiveness of Irganox E 201 in terms of stabilizing release agent GP-70-S.

Example 2

Because both GP-70-S and Ciba Irganox E 201 are liquid and mutually miscible, GP-70-S alone, Irganox E201 alone, and a mixture of the two were run in a DSC (Differential Scanning Calorimeter) at a heating rate of 10° C./min from 25° C. to 350° C. The composition and result of each DSC scan is shown in Table 3. FIG. 1 illustrates the actual DSC scanning curves of the compositions shown in Table 3.

TABLE 3

| Sample | Compositions | DSC Scan Results |
|---|---|---|
| C-5 | 100 wt % GP-70-S | No exothermic decomposition observed under nitrogen purge |
| C-6 | 100 wt % GP-70-S | Exothermic decomposition seen after 190° C. under air purge, which peaked at 287° C. |
| E-3 | 99 wt % GP-70-S 1 wt % Ciba Irganox E 201 | Rapid exothermic decomposition occurred after 276° C. under air purge, which peaked at 312° C. |
| E-4 | 94 wt % GP-70-S 6 wt % Ciba Irganox E 201 | Rapid exothermic decomposition occurred after 311° C. under air purge, which peaked at 335° C. |

DSC scans of C-5 and C-6 in Table 3 showed that GP-70-S undergoes an oxidative decomposition under air in the recorded temperature range of 190° C. and greater, because no exothermic decomposition was observed under nitrogen atmosphere and like heating. The DSC scans of E-3 and E-4 showed that the presence of Irganox E 201, even in a small amount, stabilizes GP-70-S and moves the oxidative decomposition to a higher temperature.

Example 3

GP-70-S alone, Irganox E201 alone, and a mixture of the two were run in a TGA (Thermal Grametric Analyzer) at a heating rate of 10° C./min from 24° C. to 1000° C. under air atmosphere. TGA monitored the weight loss of tested samples continuously in the studied temperature range. The weight loss onset temperature was the inflection point where temperature of the tested sample started to show a significantly different rate of weight loss during a TGA scan. Usually the higher the onset temperature, the more thermally stable the sample was. The composition and result of each respective TGA scan is illustrated in Table 4.

TABLE 4

| Sample | Compositions | Weight Loss Onset Temperature | % Total Weight Loss Between 24-300° C. | % Total Weight Loss Between 24-350° C. |
|---|---|---|---|---|
| C-7 | 100 wt % GP-70-S | 246.9° C. | 9% | 16% |
| E-5 | 99 wt % GP-70-S 1 wt % Ciba Irganox E 201 | 291.2° C. | 2.7% | 10% |

Comparing the TGA scan results of C-7 and E-5, it can be seen that the presence of Irganox E201, even in a small amount, stabilizes GP-70-S by reducing the total weight loss and moving the weight loss onset temperature up by approximately 44° C.

The invention has been described in detail with particular reference to preferred embodiments thereof, but it will be understood that variations and modifications can be effected within the spirit and scope of the invention.

The invention claimed is:

1. A process of making a dye-receiver element for image transfer from a donor element, said dye-receiver element comprising a support having thereon an extruded dye-receiving layer, wherein the dye-receiver element is made by a process comprising:

(a) forming a melt comprising a polymer, a release agent, and a release agent thermal stabilizer, wherein said release agent thermal stabilizer is alpha-tocopherol or a derivative thereof;

(b) extruding or coextruding the melt at a temperature of 190° C. and greater as a single-layer film or a layer of a composite film as the dye-receiving layer; and (c) applying the dye-receiving layer to the support.

2. The process of claim 1, wherein a ratio of release agent to alpha-tocopherol or a derivative thereof is 80:1 to 1:1.

3. The process of claim 1, wherein a ratio of release agent to alpha-tocopherol or a derivative thereof is 16:1 to 2:1.

4. The process of claim 1, wherein the release agent has the formula:

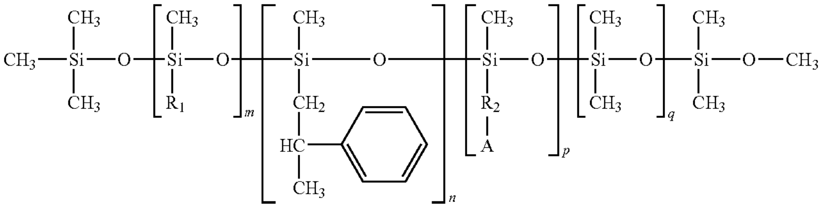

wherein $R_1$ is an alkyl chain of $C_9H_{19}$ or greater; $R_2$ is an alkyl chain of $C_3H_6$ or greater; A is NH—$R_3$, $NHNH_2$, NHCO—$R_3$, NH—$R_4$—$NH_2$, or NHCO—$R_4$—$NH_2$; $R_3$ is an alkyl chain of $C_2H_5$ or greater; $R_4$ is an alkyl chain of $C_2H_4$ or greater; m is from 0 to 95 weight percent; n is from 0 to 70 weight percent; p is from 0 to 40 weight percent; and q is from 0 to 95 weight percent, with the proviso that when m is 0, then n is 0, and $R_3$ is an alkyl chain of $C_8H_{17}$ or greater, otherwise when m is greater than 0, n is from 0.1 to 70 weight percent, based on the total weight of the release agent.

5. The process of claim 1, wherein the release agent is present in an amount greater than or equal to $5.5\times10^{-4}$ g/m$^2$.

6. The process of claim 1, wherein the release agent is present in an amount of from $5.5\times10^{-4}$ g/m$^2$ to 0.022 g/m$^2$.

7. The process of claim 1, wherein the polymer is a polycarbonate, a polyester, or a combination thereof.

8. The process of claim 1, wherein the melt further comprises a phosphorous-containing stabilizer.

9. A process of making a dye-receiver element for image transfer from a dye-donor element, said dye-receiver element comprising a support having thereon an extruded dye-receiving layer, wherein the dye-receiver element is made by a process comprising:

(a) forming a melt comprising a polymer and a thermal stabilizer, wherein said thermal stabilizer is alpha-tocopherol or a derivative thereof;

(b) extruding or coextruding the melt at a temperature of 190° C. and greater as a single-layer film or a layer of a composite film as the dye-receiving layer; and (c) applying the dye-receiving layer to the support.

* * * * *